May 6, 1947.  J. K. McDERMOTT  2,420,183

ADJUSTABLE VALVE GUIDE

Filed Nov. 23, 1944

INVENTOR.
John K. McDermott
BY Brown, Critchlow & Flick
ATTORNEYS.

WITNESSES.
F. J. Maloney.

Patented May 6, 1947

2,420,183

UNITED STATES PATENT OFFICE 2,420,183

ADJUSTABLE VALVE GUIDE

John K. McDermott, Pittsburgh, Pa.

Application November 23, 1944, Serial No. 564,791

3 Claims. (Cl. 251—27)

The invention relates to valves of the type generally used in regulators for controlling the pressure and flow of either gaseous or liquid fluids.

As usually constructed, such valves have a casing which is provided interiorly with a partition that divides the casing into inlet and outlet chambers. The partition is usually provided with two coaxial ports each having a valve seat formed at a side thereof, and flow through the ports is controlled by two like valves which are attached to a stem that is mounted in the casing for movement axially of the ports. Adjacent to each valve and lying within the port that it controls the stem is provided with guides in the form of angularly spaced metal arms which bear against the wall of the port to position and guide the valve.

When these guides wear they chatter against the walls of the ports, which chattering accelerates wear of the guides, and the noise of metal contacting against metal annoyingly carries along the pipes or conduits to which the valve is attached. Replacing a worn guide usually results in failure because frequently a new guide does not properly fit a port, especially if the port has also become worn by the chattering of an old guide.

Furthermore, when such valves are used to effect a material reduction of the pressure of a gas which contains moisture, refrigeration of the moisture takes place with the result that the valves become frozen and locked, usually in a partly open position so that all control over the pressure is lost. Such freezing is accentuated by reason of the fact that the valve parts, including the guides, are made of metal.

The object of this invention is to provide valves of the type here contemplated with guides which may readily be adjusted to compensate for wear and thus prevent or materially reduce chattering, also to provide a guide whose port-contacting portions are made of a non-metallic material which materially reduces noise if chattering should take place.

Figure 1:
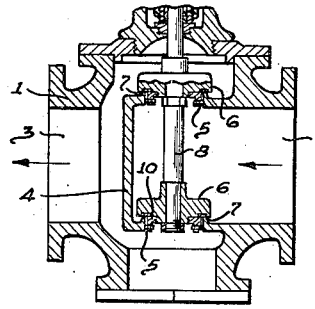
Figure 2:
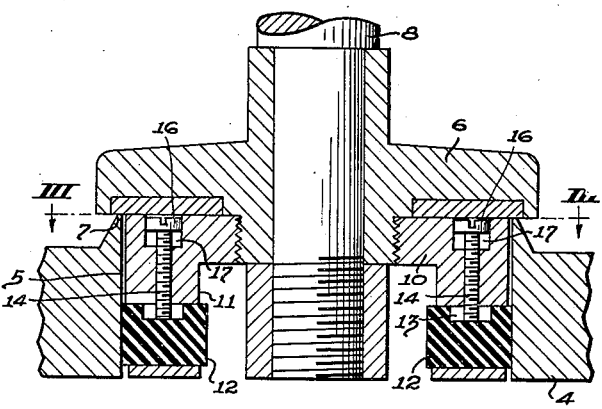
Figure 3:
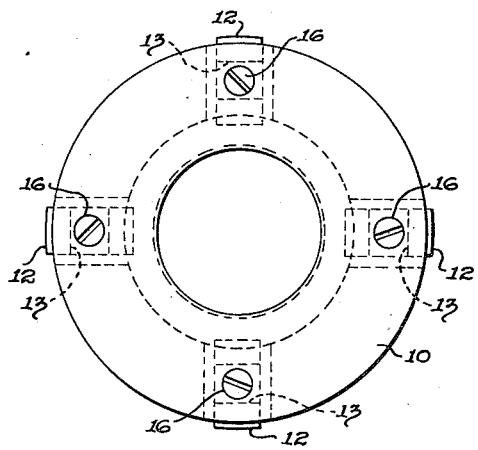

The invention is illustrated in the accompanying drawings, of which Fig. 1 is a vertical central longitudinal sectional view of one form of a pressure regulator valve having two valve heads or closures equipped with guides made according to the invention; Fig. 2 a sectional view to enlarged scale of one of the like valves and valve ports shown in Fig. 1; Fig. 3 a plan view of the guide structure, the plane of view being indicated by the line III—III, Fig. 2; and Fig. 4 a side view of the guide structure shown in Fig. 3.

The valve shown in Fig. 1 comprises a casing 1 whose interior is divided into an inlet chamber 2 and an outlet chamber 3 by a partition 4 which is provided with two like coaxially-disposed cylindrical ports 5. The flow through each of these ports is controlled by like valves 6 each of which is adapted to bear upon a seat 7 formed on the upper side of the port. These valves are attached to a stem 8 which is adapted to be moved axially of the ports by any well known diaphragm or other desired type of valve regulator not shown in the drawings.

Figure 4:
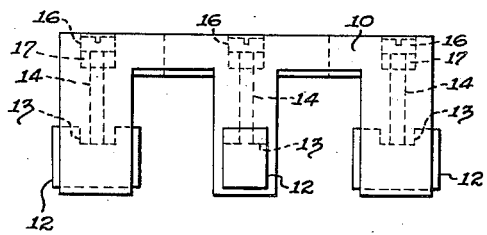

As shown in Figs. 2, 3 and 4, each valve is provided with a guide in the form of a ring 10 which has screw threaded engagement with the valve stem and is provided with depending arms 11 which are angularly spaced around stem 8. As illustrated, ring 10 is preferably provided with four arms 11 which are spaced ninety degrees apart. The lower end of each of these arms is provided with a laterally adjustable guide block 12 which is formed to bear at its outer end against the wall of port 5. For thus supporting the guide block the lower end of each arm is provided with an opening which is radially disposed with relation to the valve stem and is shaped to slidably receive the block, which, as illustrated, is rectangular in form. The upper face of each block is provided with a groove 13 adapted to receive the lower end of a set screw 14 which extends downwardly through the arm and is provided with a head 16 that lies in a recess 17 formed in the upper face of ring 10. As has been stated, blocks 12 are preferably formed of a non-metallic hard material such as a suitable thermo-plastic.

In assembling my improved guide with a valve, blocks 12 are clamped in their required position before ring 10 is attached to the valve stem, the clamping of each block being effected by tightening the set screw 14 that bears upon the base of the groove in its upper face. Ring 10 is then attached to the valve stem. When the outer ends of the guide blocks wear, ring 10 may be removed from the stem and the guide blocks adjusted outwardly the required amount. If during the use of the valve a set screw should loosen, neither the set screw nor the block that it engages can become separated from the guide structure and foul the valve. The set screw can not escape because its head lies within the ringed recess 17 which is closed by valve 6, and the guide block can not escape from its pocket because the set screw is of such length that its lower end always lies within groove 13 when the ring is attached to the valve, According to the provisions of the patent statutes, I have explained the principle and operation of my invention, and have illustrated and described what I now consider to represent its best embodiment. However, I desire to have it understood that, within the scope of the appended claims, the invention may be practiced otherwise than specifically illustrated and described.

I claim:

1. A pressure controlling valve comprising a casing having a partition therein provided with a cylindrical port having a valve seat at a side thereof, a stem mounted for movement axially of said port and provided with a valve for closing it, a guide attached to said stem and provided with a plurality of angularly spaced arms lying within said port, each of said arms being provided with a laterally adjustable guide block, and means for clamping each guide block firmly to each arm in a position to bear against the wall of said port.

2. A pressure controlling valve comprising a casing having a partition therein provided with a cylindrical port having a valve seat at a side thereof, a stem mounted for movement axially of said port and provided with a valve for closing it, a guide ring attached to said stem and provided with a plurality of angularly spaced arms lying within said port, the lower end of each of said arms being provided with a radially disposed opening, a guide block adjustably mounted in each such opening, and set screws extending through said ring and bearing upon said blocks to hold them in position to bear at their outer ends against the wall of said port.

3. A pressure controlling valve comprising a casing having a partition therein provided with a cylindrical port having a valve seat at a side thereof, a stem mounted for movement axially of said port and provided with a valve for closing it, a guide provided with a plurality of angularly spaced arms attached to said stem and lying within said port, each of said arms being provided with a laterally adjustable guide block made of non-metallic material, and means for clamping each guide block firmly to each arm in a position to bear at its outer end against the wall of said port.

JOHN K. McDERMOTT.

REFERENCES CITED

The following references are of record in the file of this patent:

UNITED STATES PATENTS

| Number | Name | Date |
|---|---|---|
| 645,722 | Holmes | Mar. 20, 1900 |
| 694,773 | Morris | Mar. 4, 1902 |
| 1,721,114 | Hampton | July 16, 1929 |
| 2,117,853 | Queen | May 17, 1938 |